US011958586B2

(12) United States Patent
Trautmann et al.

(10) Patent No.: US 11,958,586 B2
(45) Date of Patent: Apr. 16, 2024

(54) CANOPY AND DOOR ARRANGEMENT FOR A NON-PRESSURIZED AIRCRAFT

(71) Applicant: AIRBUS HELICOPTERS DEUTSCHLAND GMBH, Donauworth (DE)

(72) Inventors: Christian Trautmann, Donauworth (DE); Eric Dersahakian, Augsburg (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 235 days.

(21) Appl. No.: 17/562,738

(22) Filed: Dec. 27, 2021

(65) Prior Publication Data

US 2022/0227472 A1 Jul. 21, 2022

(30) Foreign Application Priority Data

Jan. 18, 2021 (EP) .................... 21400001

(51) Int. Cl.
*B64C 1/00* (2006.01)
*B64C 1/14* (2006.01)
(Continued)

(52) U.S. Cl.
CPC .......... *B64C 1/1461* (2013.01); *B64C 1/1476* (2013.01); *B64C 27/06* (2013.01);
(Continued)

(58) Field of Classification Search
CPC ....... B64C 1/14; B64C 1/1407; B64C 1/1461; B64C 1/1476; B64C 27/04; B64C 27/06;
(Continued)

(56) References Cited

U.S. PATENT DOCUMENTS 6,427,383 B1 * 8/2002 Brooks ..................... E05C 9/00
49/141
9,394,053 B2 7/2016 Baudry et al.
(Continued)

FOREIGN PATENT DOCUMENTS

EP 2439135 B1 4/2012
EP 2626294 A2 8/2013
(Continued)

OTHER PUBLICATIONS

US Military TV "French air force unveils H160 Guépard (Cheetah) Attack helicopter", Youtube, Nov. 28, 2020, p. 1. pp. XP054981904, URL ht tps://www.youtube.com/watch?v=1X7G22PN5uA.
(Continued)

*Primary Examiner* — Chi Q Nguyen
(74) *Attorney, Agent, or Firm* — BROOKS KUSHMAN P.C.

(57) ABSTRACT

The integration of a hinged door with a door leaf in a non-pressurized aircraft. The non-pressurized aircraft includes a canopy frame with a canopy frame cross-section profile. The canopy frame cross section profile has first and second canopy frame faces that are arranged at a predetermined angle relative to each other, and a third canopy frame face that is arranged between the first and second canopy frame faces. The non-pressurized aircraft further includes a hinge that is entirely arranged within the outline of the non-pressurized aircraft and pivotally mounts the door leaf to the third canopy frame face.

20 Claims, 4 Drawing Sheets

(51) Int. Cl.
    *B64C 27/06*     (2006.01)
    *E05D 7/12*     (2006.01)

(52) U.S. Cl.
    CPC ........ *E05D 7/121* (2013.01); *E05Y 2900/502* (2013.01); *E05Y 2900/531* (2013.01)

(58) Field of Classification Search
    CPC ........... E05D 7/12; E05D 7/121; E05D 7/125; E05Y 2900/502; E05Y 2900/50; E05Y 2900/531
    See application file for complete search history.

(56) References Cited

U.S. PATENT DOCUMENTS

| | | | | |
|---|---|---|---|---|
| 10,807,706 | B2 * | 10/2020 | Joussellin | B64C 1/1492 |
| 11,174,000 | B2 * | 11/2021 | Gorgoglione | B64C 1/1492 |
| 2004/0104306 | A1 * | 6/2004 | Pautis | B64C 1/1484 |
| | | | | 244/129.3 |
| 2006/0202087 | A1 * | 9/2006 | Mortland | B64C 1/1407 |
| | | | | 244/129.5 |
| 2013/0200214 | A1 * | 8/2013 | Sumner | B64C 1/32 |
| | | | | 244/129.5 |
| 2016/0214702 | A1 | 7/2016 | Stucki | |
| 2016/0245006 | A1 * | 8/2016 | Joussellin | E06B 3/46 |
| 2017/0137108 | A1 * | 5/2017 | Lecerf | B64D 9/00 |
| 2017/0291689 | A1 * | 10/2017 | Halcom | B64C 27/20 |
| 2018/0009532 | A1 * | 1/2018 | Cazals | B64D 11/0602 |
| 2020/0347656 | A1 * | 11/2020 | Groninga | B64C 1/1438 |
| 2022/0090428 | A1 * | 3/2022 | Groninga | E05F 17/00 |

FOREIGN PATENT DOCUMENTS

| | | |
|---|---|---|
| EP | 2626294 A3 | 10/2013 |
| EP | 3050795 A1 | 8/2016 |
| EP | 3326904 A1 | 5/2018 |

OTHER PUBLICATIONS

European Search Report for European Application No. EP 21400001.0, Completed by the European Patent Office, dated Jun. 15, 2021, 10 pages.

* cited by examiner

CANOPY AND DOOR ARRANGEMENT FOR A NON-PRESSURIZED AIRCRAFT

CROSS-REFERENCE TO RELATED APPLICATIONS

This application claims priority to European patent application No. EP 21400001.0 filed on Jan. 18, 2021, the disclosure of which is incorporated in its entirety by reference herein.

TECHNICAL FIELD

The present embodiments relate to a non-pressurized aircraft, and, more particularly, to the integration of a hinged door in a non-pressurized aircraft such that the associated hinge is entirely arranged within the outline of the non-pressurized aircraft.

BACKGROUND

Generally, doors separate environments and provide access to the environments that they separate. When such doors are used in aircrafts, they usually fulfill the following major functions: they close the aircrafts in operation, they contribute to carrying flight loads in corresponding cargo compartments and allow access to these cargo compartments, they allow passengers and crew to enter and exit the aircrafts, and they allow external access to engine compartments.

The most commonly used doors are sliding doors or hinged doors. Sliding doors are typically opened and closed in a translational, sliding motion, while hinged doors are opened and closed in a pivotal motion around an axis defined by one or more hinges.

A sliding door usually includes one or two rails, generally installed above and below the door leaf (i.e., the moving portion of the door), in which the door leaf slides during an opening and closing movement.

For example, document EP 3 326 904 A1 describes a rotary wing aircraft with a fuselage that is equipped with at least one rail, comprising at least one sliding element, in particular a sliding door or a sliding window, that is slidably supported by the at least one rail, wherein the at least one sliding element is at least slidable along the at least one rail by means of an opening sliding movement into an opening movement direction from a fully closed position into a fully opened position, characterized in that a dampening unit is provided that dampens the opening sliding movement of the at least one sliding element upon reaching of the fully opened position.

A hinged door usually includes two or more hinges that attach the door leaf to a post (e.g., a post of the helicopter's canopy). Thus, the door leaf rotates around an axis defined by the two or more hinges during the opening and closing movements of the door leaf.

For example, document EP 2 439 135 B1 describes a door assembly, in particular for a helicopter. The door assembly has a post; a door fitted to the post by a first and second hinge arranged on an outer wall of the post, so as to rotate about a hinge axis to open and close a door opening; and an emergency release device having a release handle, and a rod which extends through the post along a release axis substantially perpendicular to the hinge axis, rotates axially, in response to operation of the release handle, from a first to a second angular position to detach the door from the post, and is fixed at one axial end to the first hinge; the release handle being connected to the rod to rotate together with the rod about its release axis.

The typical integration of a hinged door on a non-pressurized aircraft, such as a helicopter, is usually driven by contradictory needs that often lead to compromises with regard to the resulting design features. As an example, a pilot needs a wide and unobstructed field of view, which requires small lateral cross-sections for all profiles including the cross-section profiles of the canopy frame and the frame of the door leaf which the hinges attach together.

Furthermore, the cabin volume of the non-pressurized aircraft shall be maximized to provide for enough clearance around the pilot's head to ensure certification with regard to the head travel curve and for the use of night vision goggles.

Moreover, the overall volume of the non-pressurized aircraft shall be minimized for low aerodynamic drag, which implies small cross-section profiles and surface area, and low weight.

However, huge cross-sections of all profiles may be desirable to assist with seal integration, to fulfil strength and stiffness requirements of primary and secondary structural elements due to flight load cases, ground load cases, dynamic behavior, and bird strike events, to provide for sufficient space for the installation of proper windshields and windows which may be glued and/or screwed, and to provide for sufficient volume to integrate the hinges of the door.

Moreover, the resulting design features have to qualify against constantly increasing safety requirements based on the Certification Specifications 29 (CS-29) and the Certification Review Items (CRIB).

SUMMARY

It is, therefore, an objective to provide a new non-pressurized aircraft with a canopy and door arrangement that overcomes the above drawbacks and leads to optimal design features. In particular, the canopy and door arrangement should be manufacturable, and have a global optimum for weight, cost, and complexity. Furthermore, the non-pressurized aircraft should have a smooth and flush outline for aerodynamic and aesthetic reasons.

These objectives are solved by a non-pressurized aircraft.

More specifically, a non-pressurized aircraft with an outline, comprises a door leaf, a canopy frame, and a hinge. The canopy frame has a canopy frame cross-section profile that comprises first and second canopy frame faces that are arranged at a predetermined angle relative to each other, and a third canopy frame face that is arranged between the first and second canopy frame faces. The hinge is entirely arranged within the outline of the non-pressurized aircraft and pivotally mounts the door leaf to the third canopy frame face.

The described embodiment has a specific arrangement of the three main functional canopy frame faces on the canopy frame cross-section profile. The functional canopy frame faces are dedicated to windshield installation, hinge integration, and seal integration. The orientation of each of the three canopy frame faces is optimized to provide the desired function and to limit the impact on field of view of the aircraft operator at the same time. The resulting cross-section profile sizes of the canopy frame and a door frame are the estimated minimum cross sections which fulfill static needs in an economical way.

The canopy frame face dedicated to windshield attachment is oriented parallel to the outline of the non-pressurized aircraft. The canopy frame face related to seals integration is advantageously oriented approximately in the direction of view of the aircraft operator (i.e., the pilot and/or co-pilot) in nominal position. The canopy frame face dedicated to hinge integration is allocated on an inclined canopy frame face between the canopy frame face dedicated to windshield attachment and the canopy frame face dedicated to seals integration.

The hinge line, which is the connection line between the two hinge-lugs that are furthest apart from each other (i.e., the most upper and most lower hinges), is generated by the hinges placed on an inclined canopy frame face of the canopy frame cross-section profile. The hinges are always attached to the inclined canopy frame face positioned inside the outline of the non-pressurized aircraft, whereas the hinge line can be either fully inside or outside the outline or any configuration in between.

The outline and the door contour (i.e., the separation line) between the two furthest apart hinge positions (i.e., defined by the upper and lower hinges) is essentially straight or low curved.

The cross-section profiles of the canopy frame and the door frame advantageously include a closed profile made from fiber reinforced plastics, metals, or a combination thereof.

The cross-section profiles of the canopy frame and the door frame provide sufficient space for the integration of two fully independent seals.

The flush outline provides for an aerodynamic and aesthetic improvement over prior art solutions and can be achieved without any negative impact on field of view and/or overall volume of the canopy area.

The canopy and door arrangement provides the option to easily integrate fail-safe functionality on the hinges by adding further hinges. Compared to a typical fail-safe device such as an anti-burst pin, the benefit of the above-described canopy and door arrangement is to have full hinge functionality even after failure of one attachment point.

Canopy frame and door frame cross-section profiles are optimized together and have a maximum field-of-view masking angle of approximately 18°.

The above-described canopy and door arrangement enables the integration of any, currently known emergency exit concept including a jettisonable door, a jettisonable window, or a jettisonable window frame without any negative impact on the field-of-view masking angle.

The canopy frame and door frame cross-section profiles are kept simple without any excessive geometrical shape adaption all along the canopy frame and door frame. Thus, manufacturing is eased and typical critical areas in a composite layup are removed. Furthermore, the clean and smooth shape of the affected canopy and door frames is free of stress concentrations and therefore beneficial for direct and optimized load transfer.

The hinge elements are arranged in a way that a lip seal fulfilling the rain gutter function can be installed on the canopy without any interference or interaction with another part.

According to one aspect, the first, second, and third canopy frame faces are separated by smooth curved transition zones.

According to one aspect, the non-pressurized aircraft further comprises a windshield that is attached to the first canopy frame face of the canopy frame cross-section profile.

According to one aspect, at least one of an adhesive, a plurality of rivets, or a plurality of bolts attaches the windshield at the first canopy frame face.

According to one aspect, the non-pressurized aircraft further comprises an additional hinge that pivotally mounts the door leaf to the canopy frame.

According to one aspect, the hinge and the additional hinge define a hinge line, wherein the non-pressurized aircraft further comprises a fail-safe hinge that is installed on the hinge line and pivotally mounts the door leaf to the canopy frame.

According to one aspect, the canopy frame further comprises a fourth canopy frame face that is arranged opposite the second canopy frame face on the canopy frame cross-section profile, wherein the door leaf comprises a door frame with a door frame cross-section profile that comprises a rear door frame face, and wherein a first virtual extension of the fourth canopy frame face and a second virtual extension of the rear door frame face intersect essentially in at least one intersection point.

According to one aspect, a point of the at least one intersection point coincides with a nominal eye reference point of an aircraft operator.

According to one aspect, an additional predetermined angle at the nominal eye reference point between the first and second virtual extensions is smaller than 19 degrees.

According to one aspect, the door frame cross-section profile comprises a front door frame face that is arranged opposite the rear door frame face on the door frame cross section profile, wherein the non-pressurized aircraft further comprises at least one seal that is arranged between the front door frame face and the second canopy frame face when the door leaf is in a closed position.

According to one aspect, the at least one seal further comprises first and second seals that are independent of each other.

According to one aspect, at least one of the canopy frame or the door frame is a closed profile.

According to one aspect, at least one of the canopy frame or the door frame comprises a composite material.

According to one aspect, the composite material comprises fiber reinforced plastics.

According to one aspect, the door leaf further comprises a jettisonable window that is adapted to be jettisoned in case of an emergency.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

DETAILED DESCRIPTION

Figure 1:
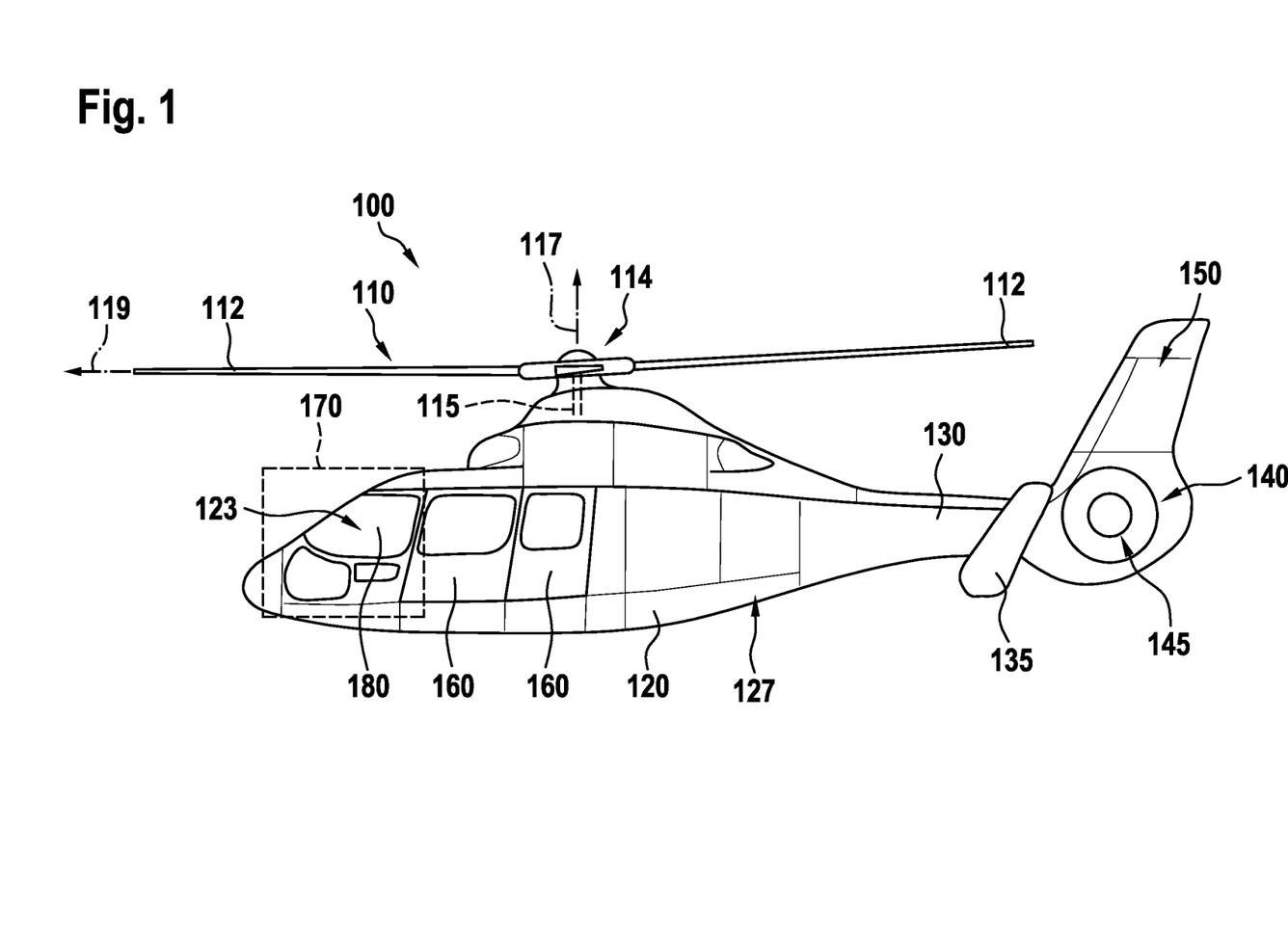
FIG. 1 is a diagram of an illustrative non-pressurized aircraft with a canopy and door arrangement in accordance with some embodiments.

FIG. 1 is a diagram of an illustrative non-pressurized aircraft 100. Non-pressurized aircraft 100 may be a rotary-wing aircraft 100, which is sometimes also referred to as rotorcraft 100. The rotary-wing aircraft 100 is exemplarily illustrated as a helicopter. Thus, for purposes of simplicity and clarity, the non-pressurized aircraft 100 is hereinafter referred to as the "helicopter" 100.

Illustratively, helicopter 100 may have a fuselage 120 that forms an airframe of the helicopter 100. The airframe may define an outline of the helicopter 100.

By way of example, the fuselage 120 is connected to a suitable landing gear and exemplarily forms a cabin 123 and a rear fuselage 127. The rear fuselage 127 is connected to a tail boom 130.

Illustratively, helicopter 100 may have at least one rotor 110, which is illustratively provided as a multi-blade rotor 110, for providing lift and forward or backward thrust during operation. The at least one multi-blade rotor 110 comprises a plurality of rotor blades 112 that are mounted at an associated rotor head 114 to a rotor shaft 115, which rotates in operation of the helicopter 100 around an associated rotor axis 117 in a rotor plane 119.

By way of example, helicopter 100 may include at least one counter-torque device 140 configured to provide counter-torque during operation, i.e., to counter the torque created by rotation of the at least one rotor 110 for purposes of balancing the helicopter 100 in terms of yaw.

If desired, counter-torque device 140 may be shrouded. The at least one counter-torque device 140 is illustratively provided at an aft section of the tail boom 130 and may have a tail rotor 145. The aft section of the tail boom 130 may include a fin 150. Illustratively, the tail boom 130 may be provided with a suitable horizontal stabilizer 135.

Illustratively, a canopy 170 may form the front portion of the cabin 123. If desired, the canopy 170 may have a frame or be frameless. As shown in FIG. 1, canopy 170 includes the radome, a windshield 180, frames, and smaller windows to improve the visibility of the aircraft operator.

Helicopter 100 may have one or more doors that provide access to the cabin 123. The doors may be hinged doors or sliding doors. As shown in FIG. 1, helicopter 100 has at least two doors with respective door leaves 160.

Each one of the two door leaves 160 is shown with a door frame and a window. If desired, the window and/or the door leaf 160 may be jettisonable. For example, the window may be a jettisonable window that is adapted to be jettisoned in case of an emergency.

Illustratively, the front door of the two doors may be a hinged door. Thus, one or more hinges may pivotally mount the door leaf 160 to one of the canopy frames. If desired, at least one of the one or more hinges may be entirely arranged within the outline of the helicopter 100.

Figure 2:
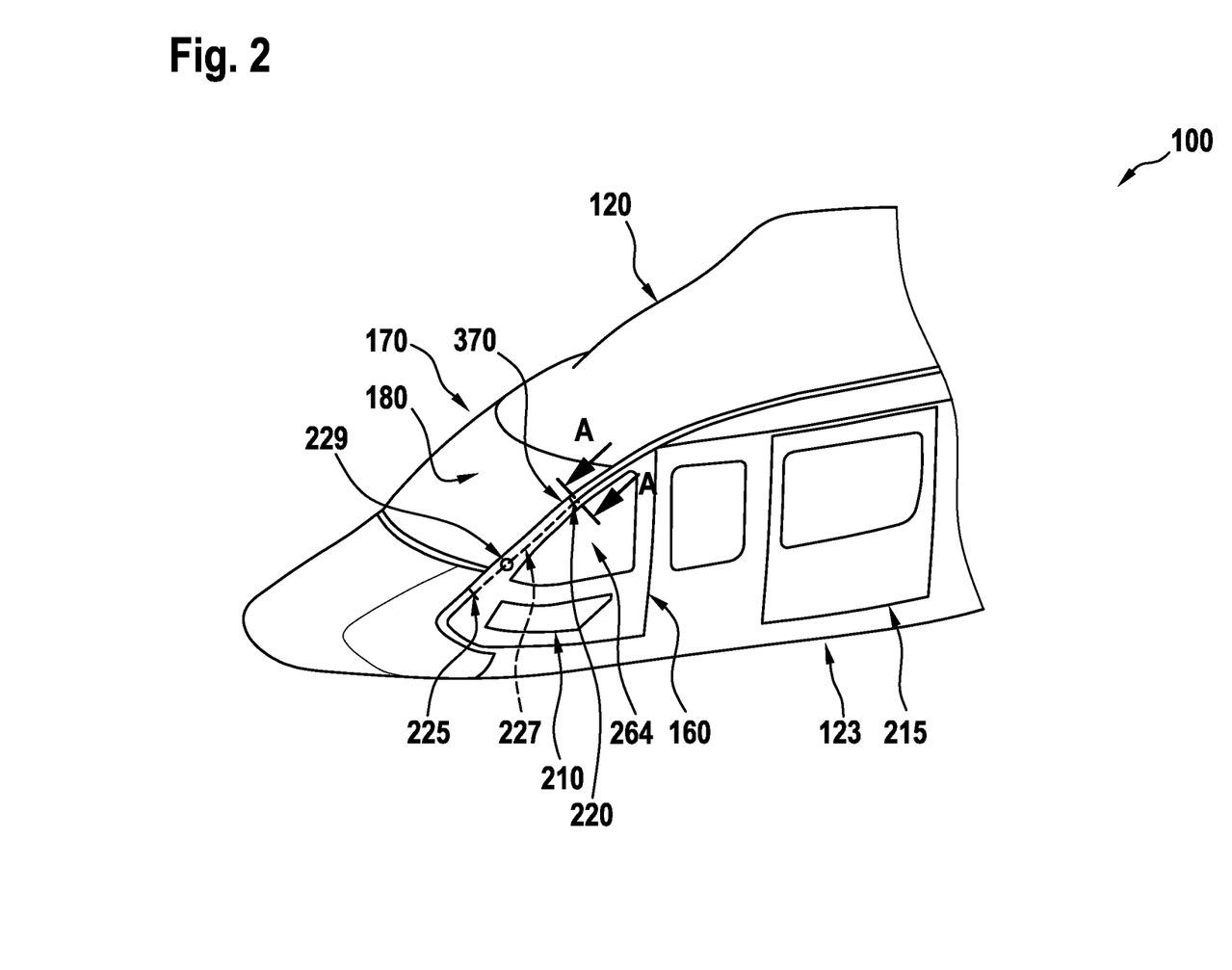
FIG. 2 is a three-dimensional diagram of an illustrative outline of a non-pressurized aircraft with an illustrative canopy and door arrangement in accordance with some embodiments.

FIG. 2 is a three-dimensional diagram of an illustrative isometric view of a portion of a non-pressurized aircraft 100 with a fuselage 120 that includes an illustrative canopy 170 and a portside door arrangement in accordance with some embodiments. The fuselage 120 with the canopy 170 and the portside doors 210, 215 may define an outline of the non-pressurized aircraft 100.

Illustratively, the canopy 170 may include a radome, a windshield 180, and frames, which are sometimes also referred to as canopy frames. The windshield 180 and the radome may be attached to the canopy frames.

The portside doors 210, 215 may include a cockpit door 210 and a cabin door 215. Illustratively, cockpit door 210 is a hinged door with a door leaf 160.

By way of example, a hinge 220 may pivotally mount the door leaf 160 to canopy frame 370. The hinge 220 may be entirely arranged within the outline of the non-pressurized aircraft 100. As shown in FIG. 2, an additional hinge 225 may pivotally mount the door leaf 160 to the canopy frame. The additional hinge 225 may be entirely arranged within the outline of the non-pressurized aircraft 100.

The hinge 220 and the additional hinge 225 may define a hinge line 227. The hinge line 227 may lie entirely inside the outline, entirely outside the outline, or partially inside and partially outside the outline of the non-pressurized aircraft 100.

As an example, the hinge line 227 may be inside the outline of the non-pressurized aircraft 100, and all hinges 220, 225 may be hidden hinges that are invisible from the outside of the non-pressurized aircraft 100 when the door leaf 160 is in a closed position. As another example, the hinge line 227 may be outside the outline of the non-pressurized aircraft 100 to provide for an increased door opening angle for operational use.

Illustratively, a fail-safe hinge 229 may be installed on the hinge line 227 and pivotally mount the door leaf 160 to the canopy frame 370. If desired, several fail-safe hinges 229 may be installed on the hinge line 227 and pivotally mount the door leaf 160 to the canopy frame 370. Fail-safe hinges 229 may ensure full functionality of the cockpit door 210 in case of a failure of one or both hinges 220, 225.

By way of example, the door leaf 160 may be equipped with a window 264. Window 264 may be a fixed, non-jettisonable window 264.

If desired, window 264 may be a jettisonable window 264 that is adapted to be jettisoned in case of an emergency. Thus, in an emergency, an aircraft operator (e.g., a pilot or co-pilot) may leave the non-pressurized aircraft through the jettisoned window opening after having jettisoned the window 264.

The jettisonable window 264 may include at least the windowpane. Preferably, the jettisonable window 264 includes the window frame and the windowpane to provide for a wider emergency exit.

Illustratively, the door leaf 160 may be jettisonable. For example, the hinges 220, 225 that pivotally mount the door leaf 160 to the canopy frame 370 may enable the jettisoning of the door leaf 160.

Consider the scenario in which hinges 220, 225 include first and second hinge elements and hinge pins that pivotally connect the first and second hinge elements. Consider further that the first hinge element is attached to the canopy frame 370 and the second hinge element to the door leaf 160. In this scenario, the door leaf 160 may be jettisoned by removal of the hinge pins. If desired, the door leaf 160 may be jettisoned by jettisoning of the first hinge elements from the canopy frame 370.

Figure 3:
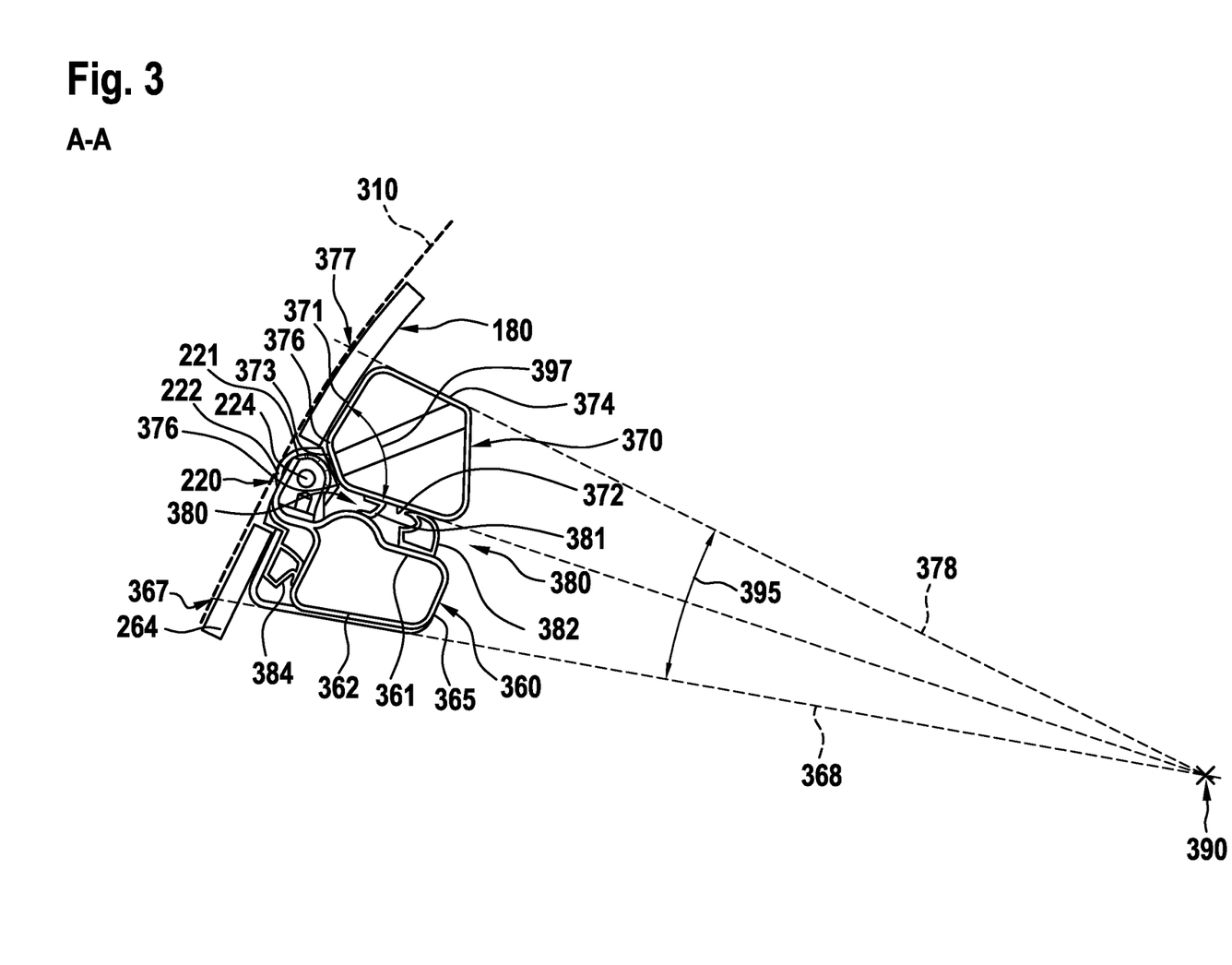
FIG. 3 is a diagram of illustrative canopy frame and door frame cross-section profiles with a hinge that is entirely arranged within the outline of a non-pressurized aircraft in accordance with some embodiments.

FIG. 3 is a diagram of illustrative canopy frame 370 and door frame 360 of door leaf 160 cross-section profiles 375, 365 at section A-A of FIG. 2 with a hinge 220 that is placed at the position of section A-A and entirely arranged within the outline 310 of a non-pressurized aircraft (e.g., non-pressurized aircraft 100 of FIG. 1 or FIG. 2).

Figure 4:
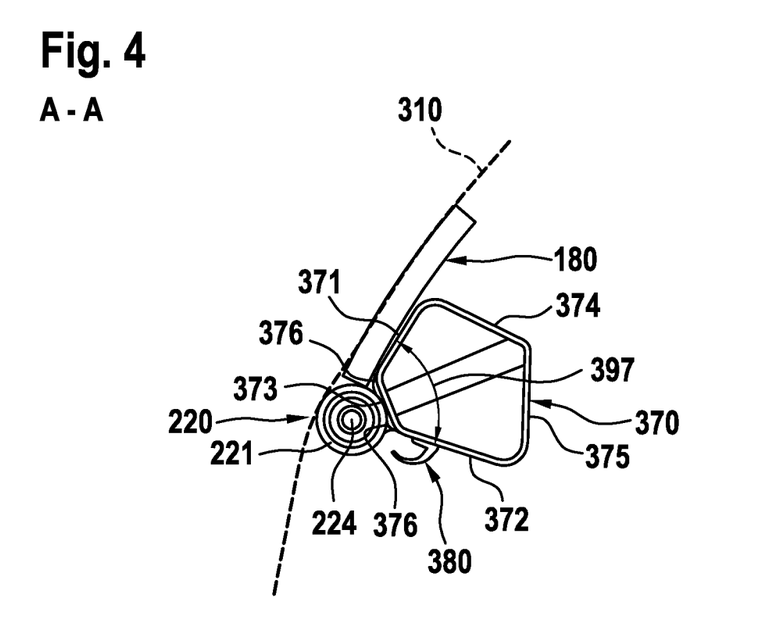
FIG. 4 is a diagram of the illustrative canopy frame cross-section profile of FIG. 3 with hinge, windshield, and seal integration in accordance with some embodiments.

FIG. 4 is a more detailed diagram of the illustrative canopy frame cross-section profile 375 of FIG. 3 with hinge 310, windshield 180, and seal 380 integration in accordance with some embodiments. The cross-section profiles 375, 365 of canopy frame 370 and door frame 360 of FIG. 3 are shown in a closed door position.

Illustratively, at least one of the canopy frame 370 or the door frame 360 is a closed profile. If desired, at least one of the canopy frame 370 or the door frame 360 may include a composite material. By way of example, the composite material may include fiber reinforced plastics.

If desired, at least one of the canopy frame 370 or the door frame 360 may include a metallic material. For example, the door frame 360 and/or the canopy frame 370 may include steel or aluminum. By way of example, the metallic material may include additive layer manufacturing.

Illustratively, the canopy frame cross-section profile 375 includes first and second canopy frame faces 371, 372 that are arranged at a predetermined angle 397 relative to each other, and a third canopy frame face 373 that is arranged between the first and second canopy frame faces 371, 372. If desired, the first, second, and third canopy frame faces 371, 372, 373 are separated by smooth curved transition zones 376.

Illustratively, the first canopy frame face 371 may be an offset to the outline 310 of the non-pressurized aircraft. By way of example, windshield 180 may be attached to the first canopy frame face 371 of the canopy frame cross-section profile 375.

As an example, at least one of an adhesive, a plurality of rivets, or a plurality of bolts may attach the windshield 180 at the first canopy frame face 371. If desired, any combination of an adhesive, a plurality of rivets, or a plurality of bolts may attach the windshield 180 at the first canopy frame face 371.

As shown in FIGS. 3 and 4, hinge 220 is entirely arranged within the outline 310 of the non-pressurized aircraft and pivotally mounts the door leaf 160 to the third canopy frame face 373. For example, a first hinge element 221 may be attached to the third canopy frame face 373 of canopy frame 370 and a second hinge element 222 to the door frame 360. A hinge pin or bolt 224 may connect the first and second hinge elements 221, 222, if desired.

The installation of the first hinge element 221 may be exclusively on the surface of the third canopy frame face 373. If desired, and as shown in FIGS. 3 and 4, the first hinge element 221 may interfere with the canopy frame 370 up to the inboard surface.

Illustratively, the canopy frame 370 may include a fourth canopy frame face 374. The fourth canopy frame face 374 may be arranged opposite the second canopy frame face 372 on the canopy frame cross-section profile 375.

By way of example, the door frame 360 may include a rear door frame face 362 on the door frame cross-section profile 365. A first virtual extension 378 of the fourth canopy frame face 374 and a second virtual extension 368 of the rear door frame face 362 may intersect essentially in at least one intersection point 390.

Illustratively, a point of the at least one intersection point 390 may coincide with a nominal eye reference point 390 of an aircraft operator (e.g., a pilot or co-pilot). The nominal eye reference point 390 together with the first and second virtual extensions 378, 368 may define a masking angle 395, which is sometimes also referred to as a blind angle 395, that impairs the aircraft operator's field of view.

Illustratively, masking angle 395 at the nominal eye reference point 390 between the first and second virtual extensions 378, 368 may be selected to be as small as possible. Preferably, masking angle 395 is smaller than 19 degrees.

By way of example, the fourth canopy frame face 374 may be in an alignment with the first virtual extension 378 between the nominal eye reference point 390 and intersecting point 377. In other words, the fourth canopy frame face 374 forms a vanishing line from the nominal eye reference point 390 and does not protrude from the first virtual extension 378.

Similarly, the rear door frame face 362 may be in an alignment with the second virtual extension 368 between the nominal eye reference point 390 and intersecting point 367. In other words, the rear door frame face 362 forms a vanishing line from the nominal eye reference point 390 and does not protrude from the second virtual extension 368.

By way of example, the door leaf 160 may be equipped with a window 264. Window 264 may be a fixed, non-jettisonable window 264.

If desired, window 264 may be a jettisonable window 264 that is adapted to be jettisoned in case of an emergency. Thus, in an emergency, an aircraft operator (e.g., a pilot or co-pilot) may jettison the window 264 and leave the non-pressurized aircraft through the jettisoned window opening.

The jettisonable window 264 may include at least the windowpane. Preferably, the jettisonable window 264 includes window frame 267 and windowpane to provide for a wider emergency exit.

As shown in FIG. 3, the window frame 267 may be attached to the door frame 360. Illustratively, the jettisonable window 264 may form a unit together with the windowpane and seal 384. If desired, the entire unit may be jettisoned in case of an emergency.

Preferably, the door frame cross-section profile 365 includes a front door frame face 361 that is arranged opposite the rear door frame face 362 on the door frame cross section profile 365.

For tightness and acoustic reasons, at least one seal 380 may be arranged between the front door frame face 361 and the second canopy frame face 372 when the door leaf 160 is in a closed position. Thereby, the at least one seal 380 may close at least a portion of the gap between the front door frame face 361 and the second canopy frame face 372.

Illustratively, the at least one seal 380 may include first and second seals 381, 382 that are independent of each other. As an example, first and second seals 381, 382 may be mounted to the front door frame face 361. As another example, first and second seals 381, 382 may be mounted to the second canopy frame face 372. As yet another example, one of the first and second seals 381, 382 may be mounted to the front door frame face 361, while the other one of the first and second seals 381, 382 is mounted to the second canopy frame face 372. If desired, a first portion of at least one of the first and second seals 381, 382 may be mounted to the front door frame face 361, while a second portion of the at least one of the first and second seals 381, 382 is mounted to the second canopy frame face 372.

It should be noted that modifications to the above described embodiments are within the common knowledge of the person skilled in the art and, thus, also considered as being part of the present disclosure.

For example, as shown in FIGS. 3 and 4, hinge 220 is shown with first and second hinge elements 221, 222 and a hinge pin or bolt 224 that connects the first and second hinge elements 221, 222. However, hinge pin 224 may be integrated into one of the first and second hinge elements 221, 222 instead of being a separate part, if desired.

Furthermore, the window 264 is shown to be attached to window frame 267 in FIGS. 3 and 4. However, the window 264 may not have a separate window frame 267. Instead, the windowpane of window 264 may be attached directly to door frame 360, if desired.

REFERENCE LIST 100 aircraft
110 multi-blade rotor 112 rotor blade
114 rotor head
115 rotor shaft
117 rotor axis
119 rotor plane
120 fuselage
123 cabin
127 rear fuselage
130 tail boom
135 horizontal stabilizer
140 counter-torque device
145 tail rotor
150 fin
160 door leaf
170 canopy
180 windshield
210 cockpit door
215 cabin door
220 hinge
221 first hinge element
222 second hinge element
224 bolt
225 hinge
227 hinge line
229 fail-safe hinge
264 window
267 window frame
310 outline
360 door frame
361 front door frame face
362 rear door frame face
365 door frame cross-section profile
367 intersecting point
368 rear view line, virtual extension
370 canopy frame
371 first canopy frame face
372 second canopy frame face
373 third canopy frame face
374 fourth canopy frame face
375 canopy frame cross-section profile
376 smooth curved transition zone
377 intersecting point
378 front view line, virtual extension
380 seal
381 first seal
382 second seal
384 seal
390 intersection point, nominal eye reference point
395, 397 angle

What is claimed is:

1. A non-pressurized aircraft with an outline, comprising:
a door leaf;
a canopy frame with a canopy frame cross-section profile that comprises:
first and second canopy frame faces that are arranged at a predetermined angle relative to each other, and
a third canopy frame face that is arranged between the first and second canopy frame faces;
a hinge that is entirely arranged within the outline of the non-pressurized aircraft and pivotally mounts the door leaf to the third canopy frame face; and
a windshield that is attached to the first canopy frame face of the canopy frame cross-section profile.

2. The non-pressurized aircraft of claim 1 wherein the first, second, and third canopy frame faces are separated by smooth curved transition zones.

3. The non-pressurized aircraft of claim 1 wherein at least one of an adhesive, a plurality of rivets, or a plurality of bolts attaches the windshield at the first canopy frame face.

4. The non-pressurized aircraft of claim 1 further comprising:
an additional hinge that pivotally mounts the door leaf to the canopy frame.

5. The non-pressurized aircraft of claim 4 wherein the hinge and the additional hinge define a hinge line, further comprising:
a fail-safe hinge that is installed on the hinge line and pivotally mounts the door leaf to the canopy frame.

6. The non-pressurized aircraft of claim 1 wherein the canopy frame further comprises a fourth canopy frame face that is arranged opposite the second canopy frame face on the canopy frame cross-section profile, wherein the door leaf comprises a door frame with a door frame cross-section profile that comprises a rear door frame face, and wherein a first virtual extension of the fourth canopy frame face and a second virtual extension of the rear door frame face intersect essentially in at least one intersection point.

7. The non-pressurized aircraft of claim 6 wherein a point of the at least one intersection point coincides with a nominal eye reference point of an aircraft operator.

8. The non-pressurized aircraft of claim 7 wherein an additional predetermined angle at the nominal eye reference point between the first and second virtual extensions is smaller than 19 degrees.

9. The non-pressurized aircraft of claim 7 wherein the door frame cross-section profile comprises a front door frame face that is arranged opposite the rear door frame face on the door frame cross section profile, further comprising:
at least one seal that is arranged between the front door frame face and the second canopy frame face in a closed position of the door leaf.

10. The non-pressurized aircraft of claim 9 wherein the at least one seal further comprises:
first and second seals that are independent of each other.

11. The non-pressurized aircraft of claim 6 wherein at least one of the canopy frame or the door frame is a closed profile.

12. The non-pressurized aircraft of claim 6 wherein at least one of the canopy frame or the door frame comprises a composite material.

13. The non-pressurized aircraft of claim 12 wherein the composite material comprises fiber reinforced plastics.

14. The non-pressurized aircraft of claim 1 wherein the door leaf further comprises:
a jettisonable window that is adapted to be jettisoned in case of an emergency.

15. A non-pressurized aircraft with an outline, comprising:
a door leaf;
a canopy frame with a canopy frame cross-section profile that comprises:
first and second canopy frame faces that are arranged at a predetermined angle relative to each other, and
a third canopy frame face that is arranged between the first and second canopy frame faces;
a hinge that is entirely arranged within the outline of the non-pressurized aircraft and pivotally mounts the door leaf to the third canopy frame face; and
an additional hinge that pivotally mounts the door leaf to the canopy frame.

16. The non-pressurized aircraft of claim 15, wherein the hinge and the additional hinge define a hinge line, further comprising:

a fail-safe hinge that is installed on the hinge line and pivotally mounts the door leaf to the canopy frame.

17. A non-pressurized aircraft with an outline, comprising:
- a door leaf;
- a canopy frame with a canopy frame cross-section profile that comprises:
  - first and second canopy frame faces that are arranged at a predetermined angle relative to each other, and
  - a third canopy frame face that is arranged between the first and second canopy frame faces; and
- a hinge that is entirely arranged within the outline of the non-pressurized aircraft and pivotally mounts the door leaf to the third canopy frame face;
- wherein the canopy frame further comprises a fourth canopy frame face that is arranged opposite the second canopy frame face on the canopy frame cross-section profile, wherein the door leaf comprises a door frame with a door frame cross-section profile that comprises a rear door frame face, and wherein a first virtual extension of the fourth canopy frame face and a second virtual extension of the rear door frame face intersect essentially in at least one intersection point.

18. The non-pressurized aircraft of claim 17, wherein a point of the at least one intersection point coincides with a nominal eye reference point of an aircraft operator.

19. The non-pressurized aircraft of claim 17, wherein at least one of the canopy frame or the door frame is a closed profile.

20. The non-pressurized aircraft of claim 17, wherein at least one of the canopy frame or the door frame comprises a composite material.

\* \* \* \* \*